Jan. 20, 1970   A. M. HARDIES ET AL   3,490,350
FILM MAGAZINE LOCATING MEANS
Filed Sept. 15, 1967   2 Sheets-Sheet 1

ALBERT M. HARDIES
HARRY L. FANNING
INVENTORS

BY *Malcolm G. Dunn*
*Robert W. Hampton*

ATTORNEYS

Jan. 20, 1970  A. M. HARDIES ET AL  3,490,350
FILM MAGAZINE LOCATING MEANS
Filed Sept. 15, 1967  2 Sheets-Sheet 2

ALBERT M. HARDIES
HARRY L. FANNING
INVENTORS

BY Malcolm G. Dunn
Robert W. Hampton

ATTORNEYS

United States Patent Office 3,490,350
Patented Jan. 20, 1970

3,490,350
FILM MAGAZINE LOCATING MEANS
Albert M. Hardies, and Harry L. Fanning, Rochester, N.Y., assignors to Eastman Kodak Company, Rochester, N.Y., a corporation of New Jersey
Filed Sept. 15, 1967, Ser. No. 667,894
Int. Cl. G03b 19/04, 17/30
U.S. Cl. 95—31    6 Claims

ABSTRACT OF THE DISCLOSURE

A film magazine has a rear casing member, including a film support surface, and a front casing member joined to enclose a film. Projections on the rear casing member extend through corresponding openings in the magazine front casing member and engage the continuous, flat, rearwardly facing surface of a rib to locate the film support surface in precise relationship to the focal plane of the camera.

Cross-reference to related applications

Reference is made to commonly assigned United States patent application Ser. No. 667,893, entitled "Film Magazine Locating Means," filed in the name of Hubert Nerwin on Sept. 15, 1967.

Background of the invention

The present invention relates to film magazines of the type disclosed in U.S. Patents Nos. 3,138,081 and 3,138,084, issued to the assignee of the present invention on June 23, 1964, and more particularly to an improvement in the means disclosed in the above-identified pending U.S. patent application for supporting an exposure frame of the film in the magazine at the focal plane of the lens system of a camera adapted to receive the magazine.

In film magazines of the type to which the invention relates, the position and flatness of the exposure frame portion of the film are established by means of a flat film support surface defined rearwardly adjacent the film exposure area by the back casing member of the magazine. The front magazine casing member, which is formed separately from the back casing member and joined thereto during assembly of the magazine, includes a film exposure aperture and guide means for maintaining the exposure frame portion of the film rearwardly of the aperture in supported cooperation with the film support surface. In prior magazines of this type, the front casing member also defines seating surface means adjacent the exposure aperture, which are adapted to seat against cooperating surface means defined by a continuous rearwardly projecting rib on the camera structure to position the magazine in predetermined relation to the camera lens system, so that the exposure frame will lie in the focal plane thereof. However, since the film support surface defined by the rear casing member is the surface which must be positioned with critical accuracy relative to the lens system, the employment of support surface means on the front casing member to locate the exposure frame relative to the lens system requires the two casing members to be joined with correspondingly critical accuracy to insure the establishment of a precise predetermined relation between the film support surface and the seating surface means on the front casing. In the present commercially produced magazines of the type disclosed in the above-mentioned U.S. Patent No. 3,138,081, the two casing members are formed of molded plastic, with the precise relation of the two assembled members being established by internal abutment surfaces. Due to the high degree of dimensional accuracy with which these abutment and seating surfaces must be located to provide acceptable magazines, this form of construction dictates a correspondingly high degree of accuracy in the manufacture and maintenance of the molds used to produce the casing members and similarly critical control of the molding and assembly operations. Therefore, to reduce the tolerance problems inherent in the above-described type of magazine construction by substantially reducing the criticality of the dimensional relation to the two casing members, the invention disclosed by the abovementioned U.S. patent application provides the critical magazine seating surface means directly on the rear casing member, which also defines the film support surface, such seating surfaces being engaged by projections extending rearwardly from the camera rib structure through openings in the front casing member. By this arrangement, the relation of the assembled casing members need be only within tolerance limitations required to maintain the film exposure area in supported cooperation with the film support surface, rather than within the substantially closer tolerance associated with locating the exposure area at the focal plane of the lens. However, since such a construction requires the addition of rearward magazine positioning projections to the rearwardly extending rib presently employed in cameras adapted to utilize magazines of this type, such magazines could not be used in such already existing cameras nor could the presently produced magazines be used in cameras so modified.

Summary of the invention

The present invention overcomes this disadvantage by means of a further simple but unobvious modification of the magazine, whereby the forwardly facing magazine seating surfaces are defined by projections formed on the back casing member and extending through the corresponding openings in the front casing member to engage rearwardly facing surface areas defined by the rib structure presently employed in cameras of this type. Since the forwardly extending projections extend through and substantially close the corresponding openings at all times, this construction also minimizes the possibility of stray light entering the interior of the magazine through the openings.

To illustrate more specifically the invention summarized above, the following detailed description describes a preferred embodiment of the invention, reference being made to the accompanying drawings in which like reference numerals refer to like elements and in which.

Figure 1:
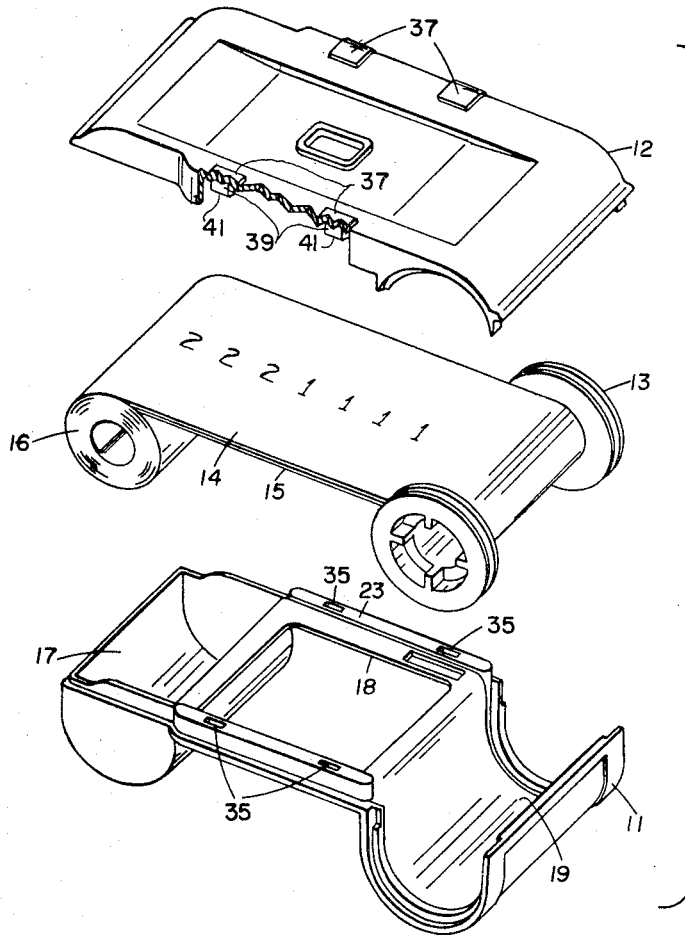
FIG. 1 is an exploded perspective view of a loaded film magazine according to the present invention.
Figure 2:
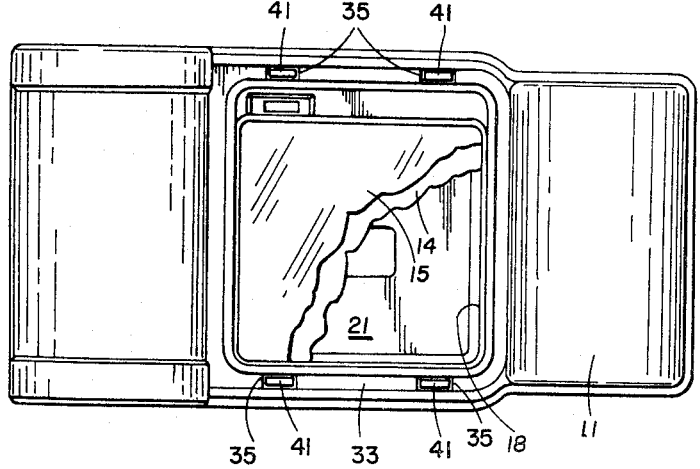
FIG. 2 is an enlarged front elevational view of the loaded magazine shown in FIG. 1 with a portion of the film and its protective backing paper shown broken away in the exposure frame area thereof.
Figure 3:
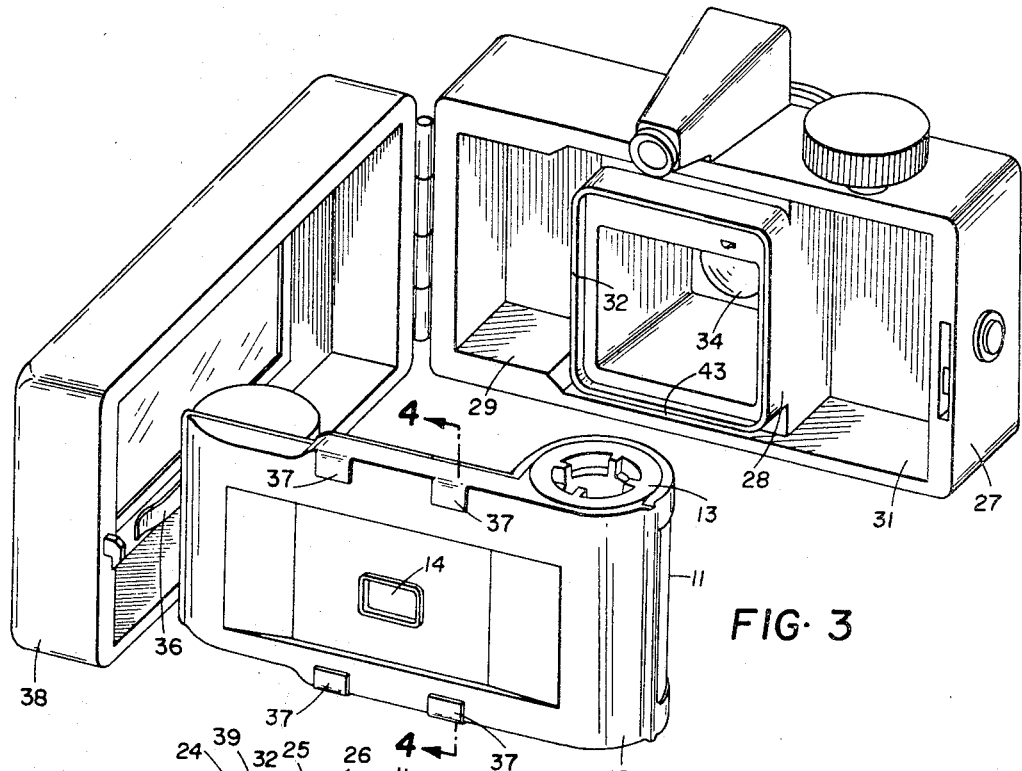
FIG. 3 is a perspective view of a camera showing the film magazine in position for insertion into the camera.
Figure 4:
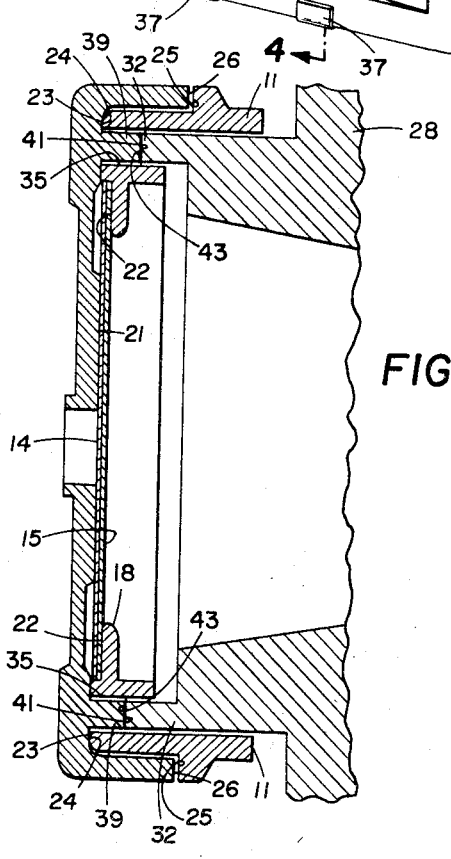
FIG. 4 is an enlarged partial cross sectional view through the film magazine taken along the lines 4—4 of FIG. 3, showing also in cross section a portion of the magazine support member of the camera in supporting engagement with the magazine.

Referring first to FIG. 1, the film magazine comprises a molded plastic front casing member 11, a molded plastic rear casing member 12, a molded plastic spool 13, a strip of light protective paper 14 attached to the spool and a length of film 15 attached to the protective paper at the end of the film adjacent the spool. In the assembled magazine the film initially is wound upon itself to form a film supply roll 16, which is housed in the film supply chamber 17 formed by the cooperation of the two casing members. The end of the protective paper beyond the film strip extends across the exposure aperture 18 in the forward wall portion of the front casing member and is attached to the spool, which is located in the similarly defined take-up chamber 19. With the magazine components so disposed, the rear casing member is cemented or otherwise permanently joined to the front casing member, as hereinafter described, thus completing the assembly operation, with the film being housed entirely within the supply chamber. When the magazine is loaded into a camera, the spool is engaged by a winding mechanism, whereby the film and paper are wound onto the spool to move successive exposure frame areas of the film into alignment with the exposure aperture, as shown in FIG. 2. To locate the film exposure area adjacent the aperture in a flat plane in predetermined relation to the magazine structure, the rear wall portion of the back casing member is provided with a slightly raised flat rectangular support surface 21, as shown in FIGS. 2 and 4, against which the film and paper are maintained in flat supported engagement by means of a rectangular rearwardly facing surface 22 surrounding the exposure aperture and engaging the film about the margin of the exposure frame area thereof. As shown in FIG. 4, this rearwardly facing surface 22 is spaced forwardly from surface 21 at a distance equal approximately to the combined thickness of the film and paper, by the engagement of rearwardly facing abutment surfaces 23 on the front casing member with corresponding areas of a flat forwardly facing surface 24, located in generally concentric parallel relation to support surface 21 on the back cover member; such engagement being maintained by cementing or otherwise joining the two casing members along the adjacent circumferential edge surfaces 25 and 26 thereof.

As shown in FIG. 4, a camera adapted to accommodate the film magazine may comprise a main housing 27 provided with a central boxlike member 28 located between chambers 29 and 31, adapted respectively to receive freely the film supply and take-up chamber portions of the magazine. As in presently available cameras of this type, a continuous rearwardly projecting rib 32 is provided along the rearward portion of member 28, and is adapted to be received by a corresponding channel 33, surrounding the exposure aperture of the magazine as shown in FIG. 2, whereby the cooperating rib and channel form a labyrinth light barrier between the two units so that of the camera components, only the boxlike member 28 need be lighttight.

To position the magazine with the film exposure area in the focal plane of lens 34 at the front of member 28, independently of the relation of the two casing members to one another, the invention disclosed in the previously mentioned patent application provides a plurality of rearwardly extending projections on rib 32, adapted respectively to extend through corresponding opening 35 in the front casing member and into contact with adjacent areas of surface 24. To maintain the magazine in seated position, spring members, as shown at 36, are adapted to engage corresponding pressure pads 37 on the magazine to urge the magazine in a forward direction when the back cover door 38 of the camera is closed. According to the present invention, however, the necessity for modifying the presently utilized camera rib structure is obviated by providing the back casing member with a plurality of forwardly extending projections 39 received within the corresponding openings 35 and defining forwardly facing co-planar seating surfaces 41 located slightly forwardly of the bottom surface 42 of channel 33 is predetermined parallel relation to film support surface 21. Thus, when the magazine is loaded into the camera and urged toward the lens system by spring members 36, the forwardly facing surfaces 41 engage corresponding areas along the rearward abutment means or surface 43 of the rib, which is received in light sealing relation by channel 33 but maintained out of contact with bottom surface 42 thereof, whereby the location of the film exposure area relative to the lens system is dependent only upon the locations of surface areas 41 and the corresponding areas along rearward surface 43 of rib 32, relative to the film support surface 21 and lens system 34, respectively. To minimize the possibility of distorting the magazine under the influence of spring members 36, it should be noted that pressure pads 37, engaged by the spring members, are located preferably in direct alignment with the corresponding projections. Although projections 39 preferably should fit freely within the corresponding openings 35 to prevent distorting the casing members or influencing the relation of the two members as established by abutment surfaces 23 and 24, the presence of the projections within the openings nevertheless minimizes the possibility of stray light entering the magazine via the openings. To further insure against this occurrence, it is also possible to provide additional light sealing means, not shown, for example by forming on member 12, about the base of each projection, a rib adapted to be received by a mating groove in member 11 surrounding the corresponding opening.

The invention has been described in detail with particular reference to a preferred embodiment thereof, but it will be understood that variations and modifications can be effected within the spirit and scope of the invention.

We claim:

1. In a film magazine for use in a camera, said camera having a focal plane and including magazine support surface portions, said magazine including a rear casing member defining a film support surface, and a front casing member, said front and rear casing members being joined to form the magazine, the improvement for cooperation with the magazine support surface portions to support the magazine in the camera, comprising:
 magazine seating means on said rear casing member, said seating means including projections on the rear casing member extending forwardly of the film support surface and defining seating surfaces engageable by the support surface portions in the camera to locate the film support surface at a predetermined position relative to the camera focal plane.

2. In a film magazine for use with a camera, the camera including an optical axis and seating abutment means having abutment surfaces in a plane perpendicular to the optical axis, the magazine including:
 (a) means defining film supply and take-up chambers, said chambers being interconnected by front and rear magazine wall members, said wall members defining a film channel communicating with the respective chambers at opposite ends of the channel,
 (b) means defining an exposure aperture in said front wall member,
 (c) means on said rear wall member defining a substantially flat film supporting surface for supporting an elongate strip of film within said channel,
 the improvement in means for supporting said magazine in said camera comprising:
 (d) means defining a plurality of openings extending entirely through said front wall member adjacent said exposure aperture, and
 (e) means on said rear wall member defining a plurality of projections extending from said rear wall member toward said front wall member and into corresponding ones of said openings, said projections defining coplanar magazine seating surfaces positioned a predetermined distance toward the front wall member from the film supporting surface, said magazine seating surfaces being adapted to engage the abutment surfaces of the camera when the magazine is located in the camera.

3. The invention defined by claim 2, wherein said front and rear wall members comprise portions of respective front and rear casing members formed of molded plastic, said projections being molded integrally with said rear casing member on said rear wall member thereof.

4. The invention defined by claim 2, wherein the abutment surfaces are defined by a generally rectangular rib and said front wall member includes means defining a generally rectangular groove in the wall member configured to receive the rib in mating relationship when said seating surfaces of the magazine are engaged with the abutment surfaces of the camera.

5. The invention defined by claim 2, wherein the camera further includes resilient means for resiliently urging the magazine into its proper position in the camera, and the magazine includes pressure pads engageable by the resilient means, said pressure pads being located on the rear wall member aligned with said projections in a direction parallel to the optical axis such that said resilient means will urge said magazine seating surfaces into engagement with the camera abutment surfaces when the magazine is located in the camera.

6. A film magazine for use in a camera, the camera including an objective defining an optical axis and a focal plane perpendicular to the optical axis, the camera further including a magazine seating rib defining abutment means in predetermined positions relative to the focal plane, the magazine comprising:
  a first casing member defining a first side of the magazine, said first casing member including means defining an exposure aperture and means defining openings in the first casing member adjacent the exposure aperture;
  a second casing member joined to said first casing member to form the magazine and defining a second side of the magazine, said second member having a film support surface for supporting film on the support surface and in the magazine; and,
  magazine seating means for seating the magazine in the camera, said seating means including projections on the second casing member extending toward and into the openings in the first casing member, said projections having ends defining coplanar seating surfaces spaced a predetermined distance from the film support surface for engaging the camera abutment means to locate the magazine in the camera.

References Cited
UNITED STATES PATENTS 3,422,740    1/1969    Nerwin _____ 95—31
3,426,666    2/1969    Nagata _____ 95—31 XR NORTON ANSHER, Primary Examiner D. S. STALLARD, Assistant Examiner U.S. Cl. X.R.
352—78